US012322411B2

(12) United States Patent
Huang et al.

(10) Patent No.: US 12,322,411 B2
(45) Date of Patent: Jun. 3, 2025

(54) SYSTEMS AND METHODS FOR CROSS-MODAL SIGNAL INFERENCE USING AUDIO SIGNALS

(71) Applicant: Robert Bosch GmbH, Stuttgart (DE)

(72) Inventors: Long Huang, Baton Rouge, LA (US); Pongtep Angkititrakul, Dublin, CA (US); Samarjit Das, Wexford, PA (US)

(73) Assignee: Robert Bosch GmbH (DE)

( * ) Notice: Subject to any disclaimer, the term of this patent is extended or adjusted under 35 U.S.C. 154(b) by 96 days.

(21) Appl. No.: 18/374,839

(22) Filed: Sep. 29, 2023

(65) Prior Publication Data

US 2025/0111859 A1 Apr. 3, 2025

(51) Int. Cl.
*G10L 21/00* (2013.01)
*G10L 21/18* (2013.01)

(52) U.S. Cl.
CPC .................................... *G10L 21/18* (2013.01)

(58) Field of Classification Search
CPC ......... G10L 21/00; G10L 21/06; G10L 21/10; G10L 21/105; G10L 21/12; G10L 21/14; G10L 21/16; G10L 21/18
USPC ................ 704/203, 217, 235, 277, 278, 500
See application file for complete search history.

(56) References Cited

U.S. PATENT DOCUMENTS 9,607,527 B2 3/2017 Hughes
10,402,929 B2 9/2019 Sharma et al.
11,410,262 B2 8/2022 Sharma et al.
2012/0306631 A1 12/2012 Hughes
2020/0065933 A1 2/2020 Sharma et al.
2022/0122590 A1* 4/2022 Haidar .................... G10L 15/16
2023/0130634 A1* 4/2023 Sainath ................ G06N 3/0455 704/232
2024/0046085 A1* 2/2024 Hori ....................... G06N 3/045
2024/0347047 A1* 10/2024 Weninger ................ G10L 15/28
2024/0394589 A1* 11/2024 Albesano ................ G10L 15/16

FOREIGN PATENT DOCUMENTS

CN 111259109 A 6/2020
JP 6567127 B2 8/2019
JP 6904544 B2 7/2021

* cited by examiner

*Primary Examiner* — Qi Han
(74) *Attorney, Agent, or Firm* — Dickinson Wright PLLC

(57) ABSTRACT

Systems and methods for converting a primary one-dimensional signal into a secondary one-dimensional signal of another modality. The primary signal is spliced into a plurality of consecutive frames. A first linear transformation transforms the frames into corresponding vectors. Positional encodings are provided on the vectors to encode relative positional information associated with each sample within each frame. A multi-head self-attention machine-learning model compares relative importance of the samples within each vector to each other in that vector to yield high-level representation vectors. A second linear transformation transforms the high-level representation vectors into corresponding secondary signal frames. The secondary signal frames are concatenated into a reconstructed one-dimensional secondary signal having a different modality than the primary signal.

20 Claims, 11 Drawing Sheets

SYSTEMS AND METHODS FOR CROSS-MODAL SIGNAL INFERENCE USING AUDIO SIGNALS

TECHNICAL FIELD

The present disclosure relates to systems and methods for cross-modal signal inference using audio signals. In embodiments, this disclosure relates to converting one-dimensional signals (e.g., audio) into other one-dimensional signals by leveraging deep learning technology.

BACKGROUND

Signal-to-signal conversion is a fundamental concept in engineering that involves the manipulation, analysis, and transformation of signals from one form to another. Signals can take many forms, such as electrical voltages, electromagnetic waves, or even digital data streams. Signal-to-signal conversion is a crucial aspect of modern technology, enabling a wide range of applications across various engineering disciplines. It plays a central role in fields like telecommunications, audio processing, control systems, and more.

DETAILED DESCRIPTION

Figure 1:
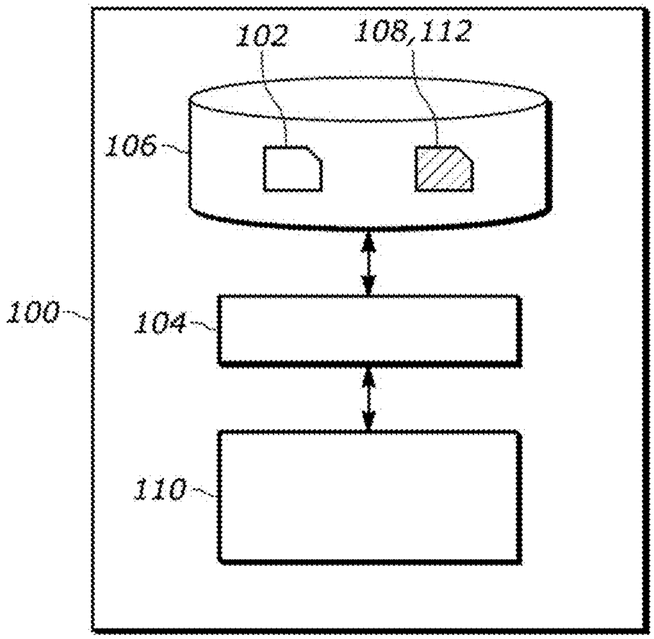
FIG. 1 generally illustrates a system for training a neural network, according to an embodiment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Signal-to-signal conversion is a fundamental concept in engineering that involves the manipulation, analysis, and transformation of signals from one form to another. Signals can take many forms, such as electrical voltages, electromagnetic waves, or even digital data streams. Signal-to-signal conversion is a crucial aspect of modern technology, enabling a wide range of applications across various engineering disciplines. It plays a central role in fields like telecommunications, audio processing, control systems, and more.

Audio-to-signal conversion involves converting an audio signal-usually an analog waveform that represents sound-into another type of signal or modality. This could be vibration signal, tactile response, haptic feedback, seismic activity, or other signals indicative of an operational characteristic of a computer-controlled machine. The benefits of substituting high-cost sensory signal with audio signal have been demonstrated across numerous applications. This is primarily because audio signals can be obtained much more cost-effectively, and the installation of acoustic sensor is flexible.

Traditional signal processing and linear transformation methods often serve as the default approach to establish transformation estimates between a reference signal and its depiction. While their effectiveness in certain applications, these convention methods present several challenges. For example, adaptability issues may arise for the real-time adaptation of new, unseen signals. Also, the accurate modeling of non-linear signals may be problematic. Further, these methods often require domain knowledge or manual engineering to extract meaningful features from raw data.

Therefore, the present disclosure provides a data-centric framework for audio-to-signal conversion, leveraging advancements in Transformer-based architecture designs.

The present disclosure leverages a transformer-based architecture to perform signal conversion or translation. This disclosure introduces systems and methods for efficiently converting one-dimensional signal (e.g., audio signals) into various other one-dimensional secondary signals. By leveraging advanced deep learning technology, the disclosed systems employs a Transformer-based architecture capable of capturing positional and global relationships between input and output signals. The proposed method exhibits improved accuracy, flexibility, scalability, and adaptability in converting audio signals into a diverse range of secondary signals.

A Transformer-based architecture was first introduced in Vaswani, Ashish, et al. "Attention is all you need," Advances in neural information processing systems 30 (2017). This publication is hereinafter referred to as Vaswani. The Transformer architecture in Vaswani (a neural network model) revolutionized the field of deep learning, specifically in Natural Language Processing (NLP). A key innovation of the Transformer architecture is the self-attention mechanism which computes the dependencies between each pair of positions in an input sequence in parallel, capturing the global dependencies in the data. The self-attention mechanism allowed the model to capture dependencies between words regardless of their positions in a sentence. This eliminated the need for recurrent or convolutional layers, making training faster and more parallelizable. The Transformer has since become the foundation for many state-of-the-art models in NLP, including BERT, GPT, and more. And, despite their initial usage in the field of NLP, Transformer architectures have also shown strong performance in other fields such as computer vision, signal processing, etc.

FIG. 1 shows a system 100 for training a neural network, e.g. a deep neural network that is part of a backbone of a deep learning model or algorithm. The neural network being trained may be a deep learning network, such as the signal converter model or signal translator model disclosed herein. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network; this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104.

The structure of the system 100 is one example of a system that may be utilized to train the signal convertor model or signal translator model described herein. Additional structure for operating and training the machine-learning models is shown in FIG. 2.

Figure 2:
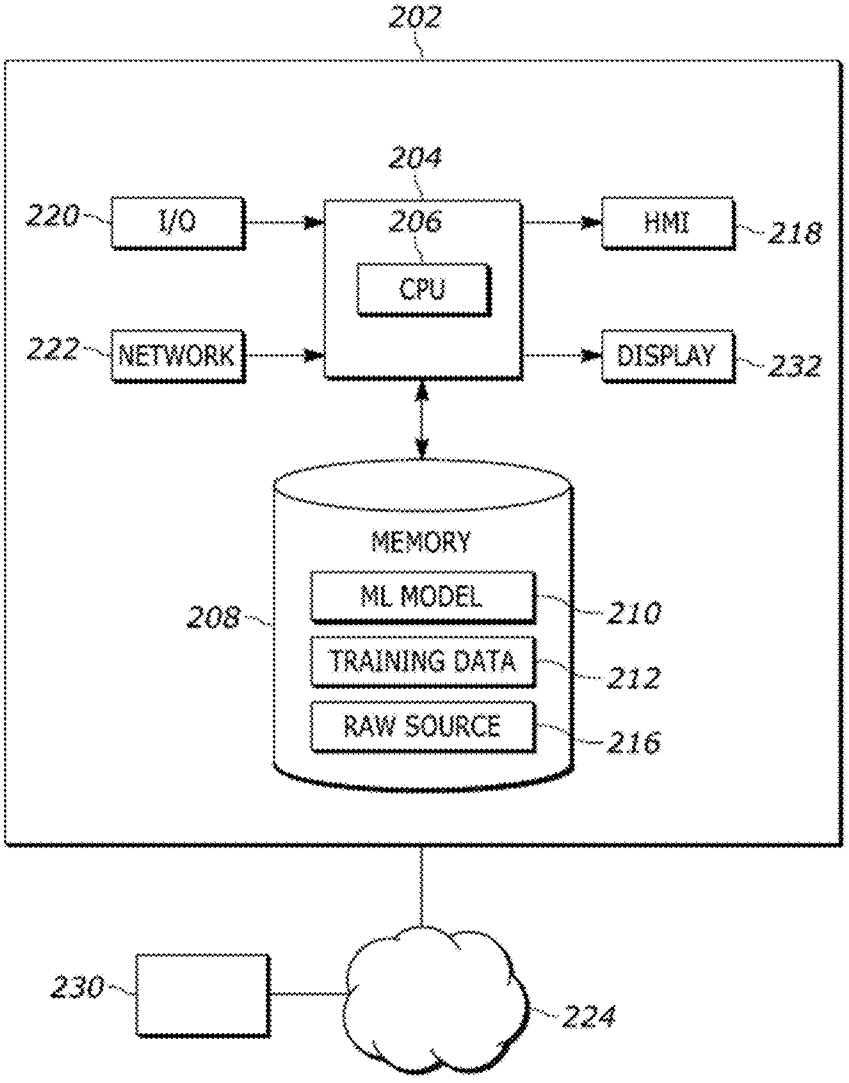
FIG. 2 generally illustrates a computer-implemented method for training and utilizing a neural network, according to an embodiment.

FIG. 2 depicts a signal conversion system 200 to implement a system for converting or translating data signals, according to an embodiment. The signal conversion system 200 may utilize the signal convertor model or signal translator model disclosed herein. The signal conversion system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families.

During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216. The machine-learning model may be or include the signal convertor model or signal translator model disclosed herein.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines, timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface). The I/O interface 220 can be referred to as an input interface (in that it transfers data from an external input, such as a sensor), or an output interface (in that it transfers data to an external output, such as a display).

The computing system 202 may include a human-machine interface (HMI) device 218 that may include any input device that enables the system 200 to receive control input. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems 202. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning model 210 or algorithm that is configured to analyze the raw source dataset 216. The raw source dataset 216 may include raw or unprocessed sensor data that may be representative of an input dataset for a machine-learning system. The raw source dataset 216 may include audio, audio segments, video, video segments, images, text-based information, audio or human speech, time series data (e.g., a pressure sensor signal over time), and raw or partially processed sensor data (e.g., radar map of objects). Several different examples of inputs are shown and described with reference to FIGS. 5-11. In some examples, the machine-learning model 210 may be or include a neural network algorithm (e.g., deep neural network) that is designed to perform a predetermined function. For example, the neural network algorithm may be configured in automotive applications to predict a torque of a motor based on the audio emitted by the motor. The machine-learning models 210 may include algorithms configured to operate the signal converter model or signal translator model described herein.

The computing system 202 may store a training dataset 212 for the machine-learning algorithm 210. The training dataset 212 may represent a set of previously constructed data for training the machine-learning model 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify patterns or signatures in audio signals and convert the audio signal to a secondary signal based on the patterns or signatures. The machine-learning algorithm 210 may be programmed to process the raw source data 216 to identify the presence of the particular features. The machine-learning algorithm 210 may be configured to identify a feature in the raw source data 216 as a predetermined feature. The raw source data 216 may be derived from a variety of sources. For example, the raw source data 216 may be actual input data collected by a machine-learning system. The raw source data 216 may be machine generated for testing the system. As an example, the raw source data 216 may include raw audio signals from a microphone or microphone array.

Figure 3A:
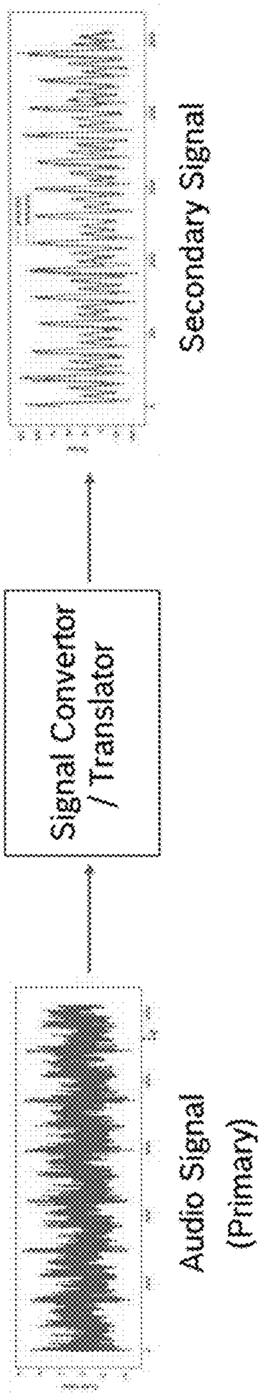
FIG. 3A generally illustrates a diagram of a signal convertor configured to convert a primary signal into a secondary signal using machine learning, according to an embodiment.

FIG. 3A generally illustrates use of the signal conversion system 200 in the form of a diagram. Here, the signal conversion system 200 is configured to convert a primary signal into a secondary signal using machine learning, according to an embodiment. A primary signal (e.g., audio signal) is received as input. A signal converter model 300 (also referred to as a signal translator model, audio translation model, transformer model, e.g., ML model 210) converts the primary signal into a secondary signal. To do so, the signal converter model relies on a Translator-based model that is further illustrated in FIG. 3B and described further herein. In one embodiment, the primary signal is an audio signal as generated from a microphone. The secondary signal can be one of a plurality of desired modals. For example, the secondary signal may be a torque signal, such that the received sound signal is translated into a torque signal, allowing the system to determine a torque of a device based on its emitted sound.

Figure 3B:
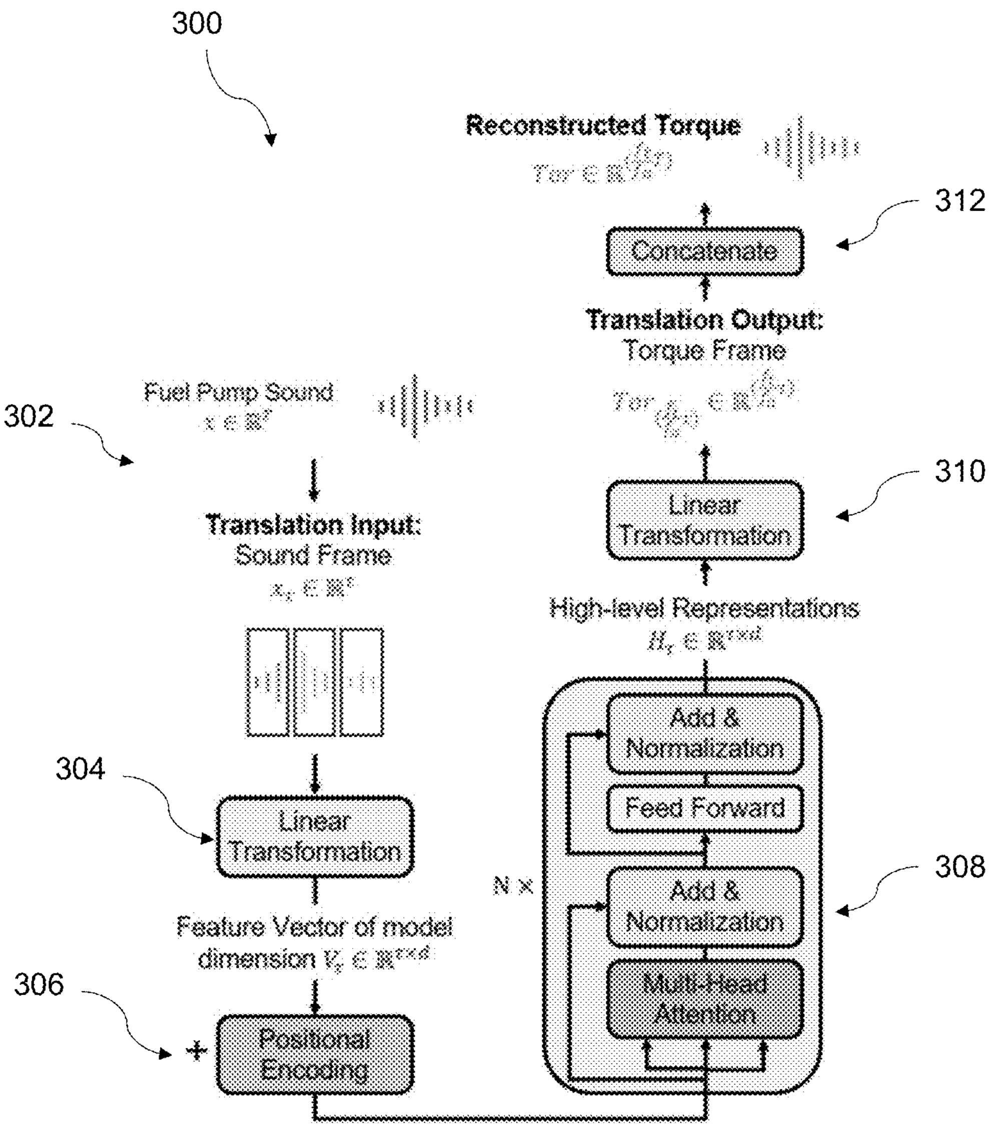
FIG. 3B generally illustrates an architecture for signal-to-signal conversion carried out by the signal convertor of FIG. 3A, according to an embodiment.

FIG. 3B illustrates an example architecture of the signal converter model 300. The signal converter model 300 is configured to transform an input signal of a first mode or modality into an output signal of a second mode or modality. In general, the signal converter model 300 can be or include an attention-based neural network that performs machine translation tasks. The attention-based neural network includes an encoder neural network that receives an input sequence and generates an encoded representation of the input sequence, and outputs high-level representations that are directly processed by a linear transformation layer to generate the secondary signal.

Figure 3C:
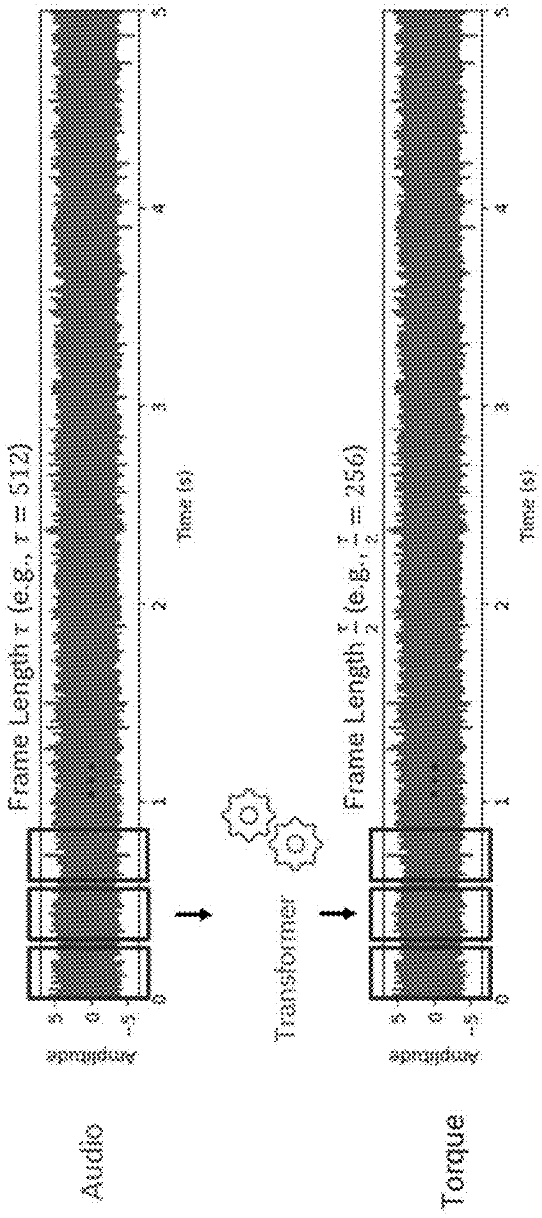
FIG. 3C generally illustrates an example of frame-based signal-to-signal conversion according to the principles of the present disclosure.

At 302, given a primary (e.g., audio) signal $x \in \mathbb{R}^T$ over time T received from a microphone (or pre-processed), it is divided or spliced into consecutive frames, each having a size t. FIG. 3C shows an embodiment of frames of audio input, shown in the bounding boxes. The size of each frame can be predetermined, and/or can be based on the size (length) of the primary signal. In an embodiment, each frame has an identical size τ. Each of these frames can be denoted as $x_\tau \in \mathbb{R}^\tau$, which can be fed into the transformer model as an individual instance.

While the raw audio input is shown in FIG. 3B to be a "fuel pump sound," this is merely an example in which a vehicle fuel pump generates a sound for translation. It should be understood that the primary signal need not be audio, and the secondary signal need not be a torque signal. Indeed, one should appreciate that the models described herein can be implemented for translation between any one-dimensional signals, including but not limited to sound, vibration, torque, temperature, heart rate variability, seismic waveforms, biological signals (e.g., EEG, EMG, EOG), time-series data, radar returns, and others.

At 304, each input audio frame $x_\tau \in \mathbb{R}^\tau$ is first transformed by a linear transformation layer into a vector belonging to $\mathbb{R}^{\tau \times d}$, where d is the model dimension. This vector represents the input data of each respective frame of audio data, and has a dimension $V_\tau \in \mathbb{R}^{\tau x d}$. Each audio frame is independent and processed separately, with a single feature vector for each audio frame. Each audio frame can be of a common size, for example τ=512 samples within each frame.

Positional encoding or positional embedding is then added at 306. Here, in order to preserve the temporal order of the audio in the input sequence, positional encoding is added to the embeddings. This allows the model to understand the position of each sound in the audio signal, specifically each position (sample) within each audio frame. In an embodiment, each vector associated with each frame are embedded with information about the relative position of each data (e.g., audio) sample within that vector or frame. Positional encoding allows the signal converter model to perform well on tasks that require sequence understanding, such as a translation of one-dimensional signals shown here where the order of frames is significant. By incorporating positional encoding, the Transformer can effectively capture both the content and the order of samples in the input data. In one embodiment, sine and cosine functions of different frequencies can be used for the positional encodings, wherein each dimension of the positional encoding corresponds to a sinusoid.

With positional encoding added, at 308 the vectors are then passed through the Transformer encoder, which includes N identical structures. Within each structure, a multi-head attention mechanism (also referred to as a multi-head attention machine-learning model) is applied to derive the input vector's self-attentions. An attention mechanism can be configured to map a query and a set of key-value pairs to an output, where the query, keys, values, and output are all vectors; the output is computed as a weighted sum of the values, where the weight assigned to each value is computed by a compatibility function of the query with the corresponding key. The attention mechanism used herein is a self-attention mechanism in that there is only one type of input (e.g., audio). The use of a multi-head self-attention mechanism allows the neural network to compare each individual position (sample) to other positions (samples) within a given frame of input data. For example, referring to FIG. 3C, for each frame shown in a bounding box, each sample (e.g., 512 samples per frame) is compared to all other samples within that frame. This allows the translation model to weigh the importance or relevance of the samples within each frame. Each head learns different attention patterns when comparing the samples.

The multi-head self-attention mechanism allows the transformer model to capture complex relationship dependencies between positions (samples) within each audio frame. An idea behind the multi-head self-attention is to have multiple "heads" or different perspectives on how the frames in the input data are related. These heads work together to understand the entire audio input better. Each head focuses on a different aspect of the relationship between the samples. To make this work, the frames in the input data are used to create three kinds of vectors: queries, keys, and values. Each head takes these query, key, and value vectors and calculates how much attention each sample should pay to every other sample in the frame. Scores for each sample can be derived with this. For example, one part of the audio data might be more important than another part of the audio data for translating purposes. The attention scores determine how much each sample should contribute to the output. In other words, some samples are weighted more than others. And, with multiple heads, each head learns different attention patterns associated with different samples of input data. After each head has done its own calculations, their results are combined. This mixing of different attention patterns helps the model capture a wide range of relationships between the samples within each frame.

As shown in FIG. 3B, the Transformer encoder at 308 has one or more add and normalize features, or layer normalizations. When applied, these improve the model's training stability and performance. For addition, after each layer (e.g., self-attention layer or feed-forward layer) in the Transformer, the output of that layer is added to the input of the layer. This is referred to as residual connection or skip connection. This preserves the original information from the input, making it easier for the model to learn. Following the addition step, the layer normalization is applied which involves normalizing the values in the layer's output to have a mean of—and a standard deviation of 1. Layer normalization helps stabilize the learning process by ensuring that the input to each layer is within a similar range of values.

In short, the self-attention mechanism splices the input into a sub-space, and then computes a relationship between those splices. The self-attention aspect of the model allows the model to compute relationships between each sample (position) and all the other samples (positions). The model works to learn the relationship between the different samples (positions) in the data sequence.

At 310, high-level representation vectors $H_\tau \in \mathbb{R}^{\tau x d}$ output from the self-attention mechanism are passed through a linear transformation layer in order to make the vector have a dimension equal to the secondary signal dimension (e.g., torque signal). Since the primary and secondary signals have different sampling rates, the dimension can be computed by sampling rate of the two domain signals. For example, the linear transformation layer outputs the frame of a secondary signal (e.g., torque) with a shape of $$\frac{f_t}{f_a}\tau.$$

Here, $f_a$ and $f_t$ represent the sampling rates of the primary and second signals, respectively.

At 312, the secondary signal frames are then concatenated to get a reconstructed signal Rec∈

$$\mathbb{R}^{\frac{f_t}{f_a}T}$$

or secondary signal. This reconstructed signal represents an estimated signal or secondary signal that is based on the primary signal. In one example, the reconstructed signal is a torque (Tor) signal, indicating the torque associated with the device (e.g., vehicle) that is emitting the sound used as the input.

FIG. 3C illustrates an example of a frame-based signal-to-signal conversion using the system described above. In this embodiment, the input signal is an audio signal, and the output signal is a torque signal. Other input and output signals can be used and derived with use of the signal converter model disclosed herein. Within each bounding box is a frame of the sound that is passed through the Transformer model of FIG. 3B.

Figure 3D:
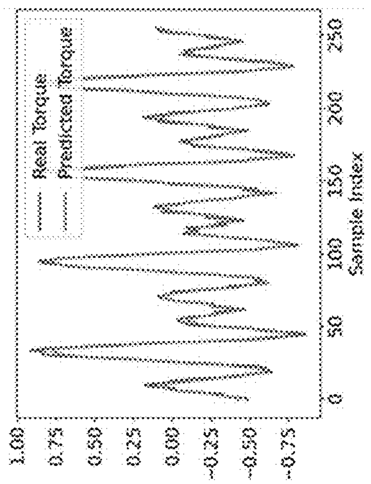
FIG. 3D generally illustrates an example of an original secondary signal and its reconstructed signal converted from the primary signal, according to an embodiment.

FIG. 3D illustrates an example of a predicted secondary signal and an actual secondary signal. The ground truth signal, shown here as "real torque" signal, is the input to the model, and the reconstructed or secondary signal is the output of the model. The predicted secondary signal is a result of the transformed primary signal. For example, a transformation model executing on the audio signal results in a predicted torque signal. The real torque signal is a result of actual torque sensor measurements, e.g., from a torque sensor. As shown in FIG. 3D, the predicted secondary signal and the actual secondary signal are extremely close, indicating a high performance of the transformation model.

In some embodiments, the initial audio signal (i.e., in the time domain) may undergo a transformation into the frequency domain, such as spectrogram, before being inputted into the signal converter model. In this scenario, a straightforward process for generating a spectrogram can be applied, followed by the subsequent step of reshaping, or flattening the resulting 2-dimensional spectrograms into a 1-dimensional sequence. For example, this sequence can be formed by concatenating each time slice of spectrograms.

In some implementation, variations of Transformer architecture could be adopted for modeling such as Conformer, which is a hybrid CNN-Transformer model, etc.

The methods and systems disclosed herein therefore provide a model grounded in data-centric and machine learning/deep learning methodologies to convert one-dimensional signal, such as audio, into a different one-dimension signal modality and vice versa. This model allows for tracking and potential modification of signal representations, enabling a seamless transition between modalities. It should be understood that the secondary signal (e.g., torque) can be converted into the primary signal (e.g., audio) using the same models described herein.

The methods and systems disclosed herein can adopt the transformer-based architecture as the core conversion model, with includes a flexible frame size for optimal adaptability. The framework concurrently processes the relationship between two modalities at frame level. This process ensures high accuracy and speed in the reconstruction of the secondary signal. This provides a straightforward extension to other one-dimensional signal-to-signal translations.

The models disclosed herein can be trained with cross-modal data. For example, the input signal during training can be audio, and the resulting secondary signal can be a representative signal of torque, wherein an actual torque value is used to compare to the secondary signal. The model can be trained until convergence, i.e. when the secondary signal computed by the model is within a threshold of the actual signal produced by a sensor.

Figure 4:
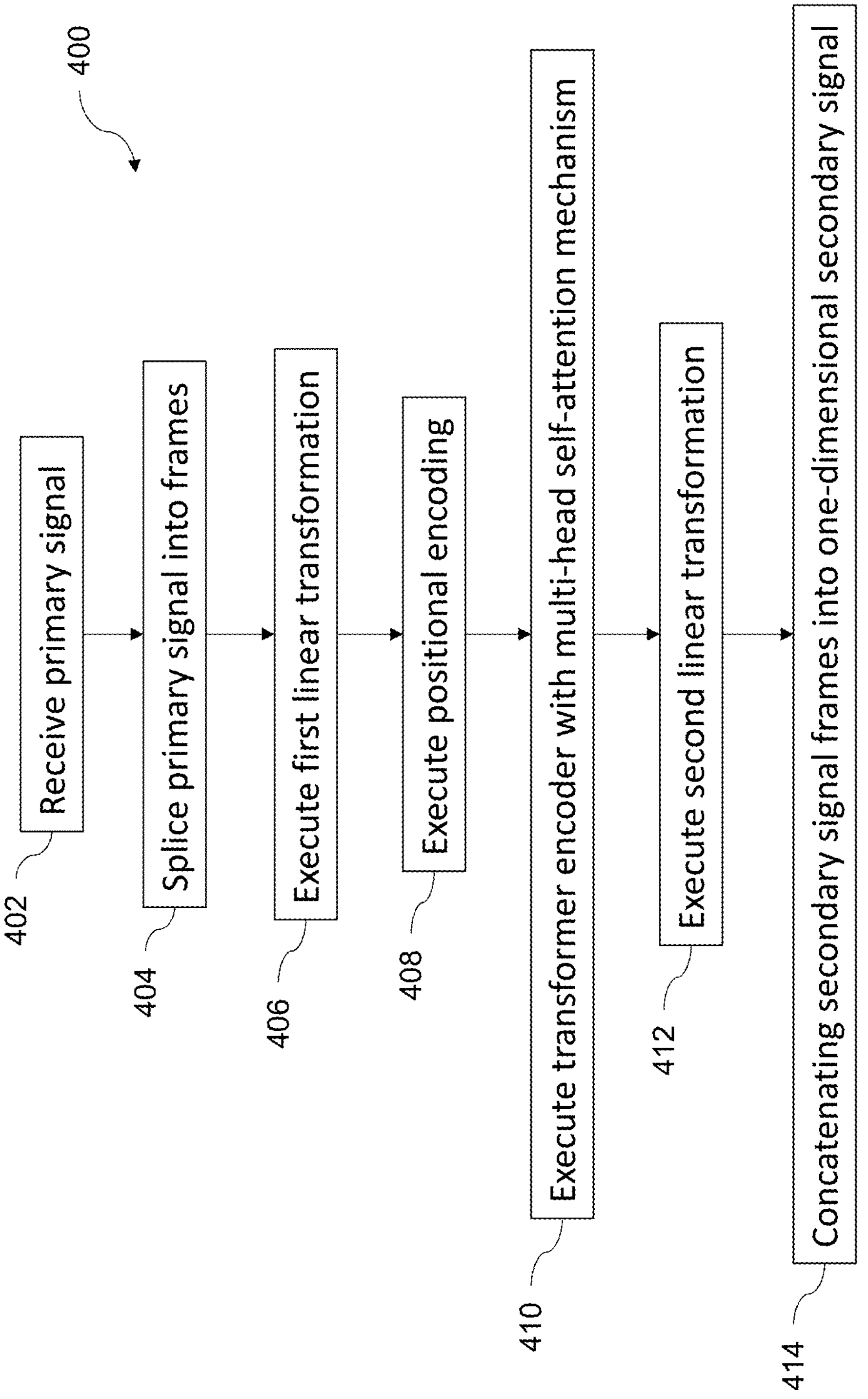
FIG. 4 is a flow diagram generally illustrating a signal conversion method, according to the principles of the present disclosure.

FIG. 4 illustrates a method 400 of transforming a primary signal into a secondary signal of another modality, according to one embodiment. The method can be executed by one or more processors described herein, relying on instructions stored in memory described herein.

At 402, the processor receives a primary signal. The primary signal may be an audio signal, or other one-dimensional signal. The audio signal may be received from a microphone, for example, or pre-processed by an associated processor.

At 404, the processor splices or segments the primary signal into a plurality of frames. Each frame can have an identical size t, which can be dependent on the size of the signal. The signal of each frame can thus be represented as $x_\tau \in \mathbb{R}^\tau$.

At 406, the processor executes a first linear transformation. In embodiments, the linear transformation layer transforms the signal of each frame into a vector belonging to $\mathbb{R}^{\tau x d}$, where dis the model dimension.

At 408, the processor executes positional encoding in order to preserve temporal order of the primary signal. In one embodiment, sine and cosine functions of different frequencies can be used for the positional encodings, wherein each dimension of the positional encoding corresponds to a sinusoid.

At 410, the processor executes a transformer encoder which includes N structures, each structure having a multi-head self-attention mechanism. In embodiments, the multi-head self-attention mechanisms are configured to map a query and a set of key-value pairs to an output, where the query, keys, values, and output are all vectors; the output is computed as a weighted sum of the values, where the weight assigned to each value is computed by a compatibility function of the query with the corresponding key. This results in high-level representation vectors $H_\tau \in \mathbb{R}^{\tau x d}$.

At 412, the processor executes a second linear transformation on the high-level representation vectors order to make the vector have a dimension equal to the secondary signal dimension.

At 414, the processor concatenates the secondary signal frames to get a single, reconstructed, secondary signal. The secondary signal can be of a different modality than the primary signal.

Figure 5:
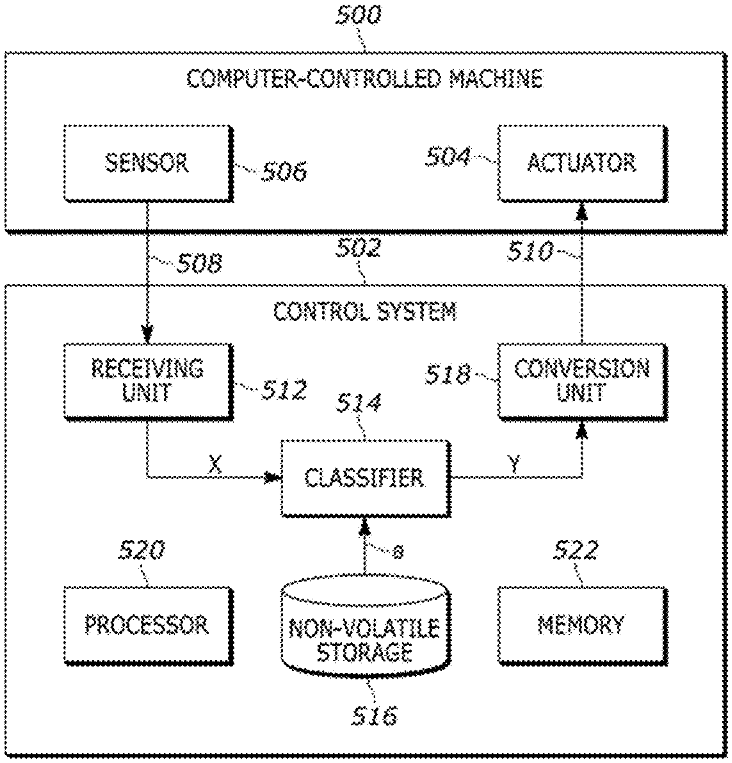
FIG. 5 depicts a schematic diagram of an interaction between a computer-controlled machine and a control system, according to an embodiment.

FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. The sensor 506 may be one or more of the sensors described above; non-limiting examples of sensor 506 include microphone, camera, video, radar, LiDAR, ultrasonic and motion sensors. In one embodiment, the sensor 506 is a microphone configured to generate audio signals of an environment within or proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine-learning algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to pre-trained classifier 306) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more machine-learning algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the machine-learning algorithms and/or methodologies as disclosed herein. Non-volatile storage 516 may also include machine-learning data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
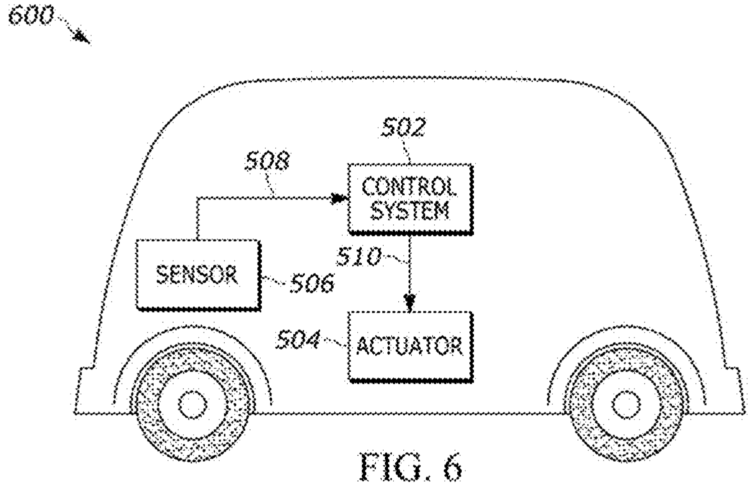
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

The models and teachings provided herein can be deployed and utilized in a plurality of settings. FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more microphones, video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
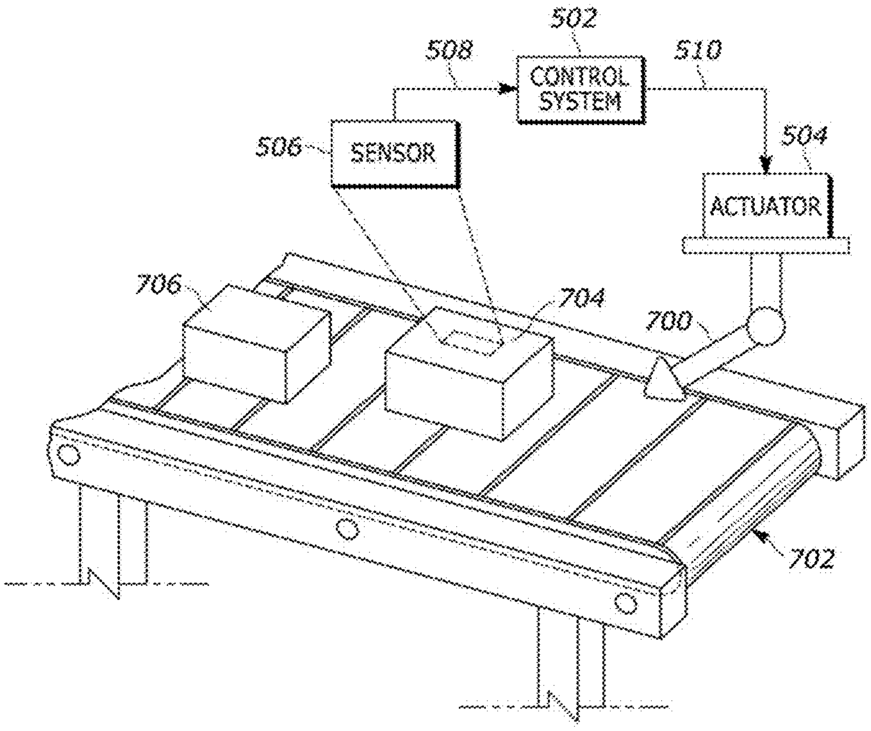
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
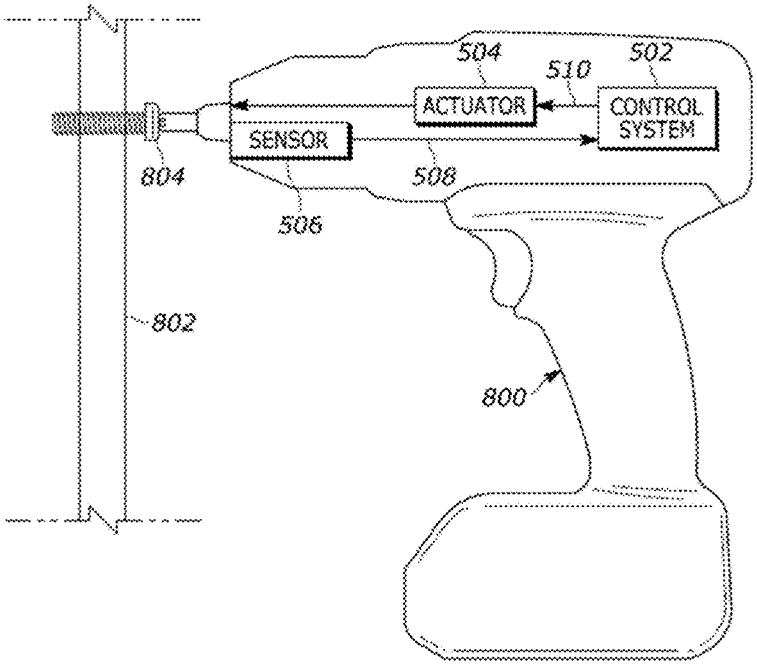
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

In another embodiment, the sensor 506 is a microphone configured to generate one-dimensional sound data associated with the power tool 800 as it is driving fastener 804 into work surface 802. Classifier 514 may be configured to determine a torque of the motor of the tool 800 by converting the sound emitted by the tool into a torque signal, according to the disclosure provided above.

Figure 9:
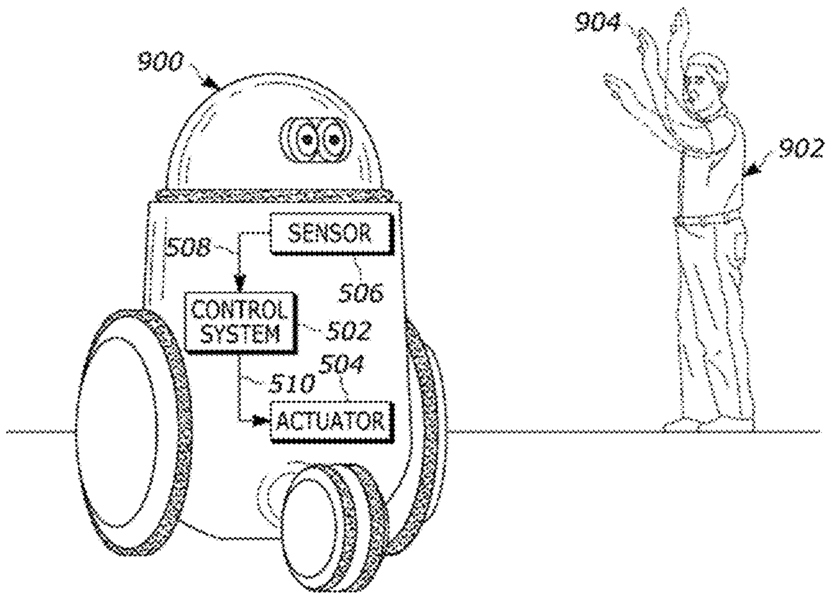
FIG. 9 depicts a schematic diagram of the control system of FIG. 5 configured to control an automated personal assistant.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
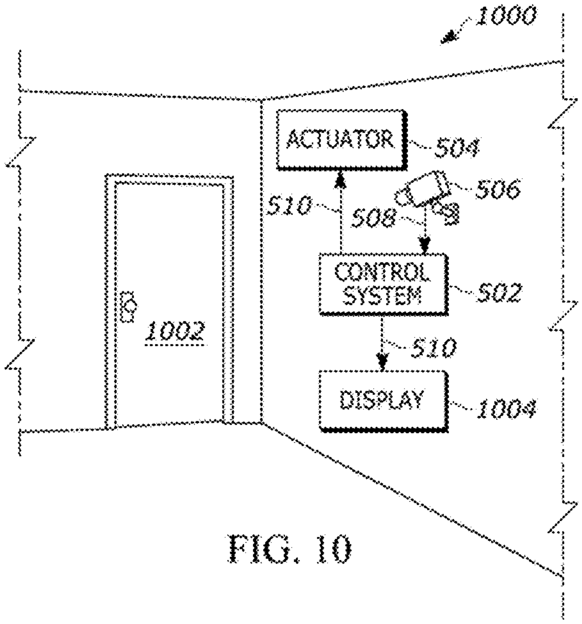
FIG. 10 depicts a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
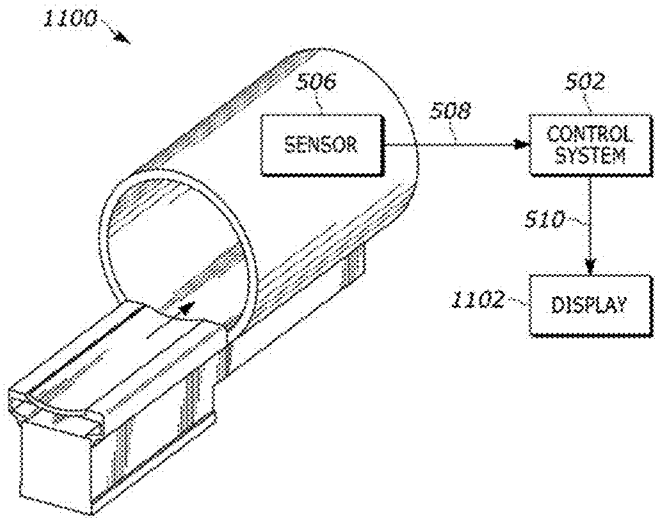
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

In this specification the term "mechanism" is used broadly to refer to a software-based system, subsystem, or process that is programmed to perform one or more specific functions. Generally, a mechanism (e.g., self-attention mechanism) will be implemented as one or more software modules or components, installed on one or more computers in one or more locations. In some cases, one or more computers will be dedicated to a particular mechanism; in other cases, multiple mechanisms can be installed and running on the same computer or computers. References to a multi-head self-attention mechanism can also be referred to as a multi-head self-attention machine-learning model.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of transforming an audio signal into a secondary signal of another modality, the method comprising:

receiving an audio signal generated from a microphone;

splicing the audio signal into a plurality of frames, each frame having a number of samples of audio data;

executing a first linear transformation to transform the frames into corresponding vectors;

executing positional encoding on the vectors to encode relative positional information associated with each sample within the vectors;

executing a transformer encoder on the vectors with the encoded positional information, wherein the transformer encoder has a multi-head self-attention mechanism configured to compare relative importance of the vectors to each other to yield high-level representation vectors;

executing a second linear transformation to transform the high-level representation vectors into corresponding secondary signal frames; and concatenating the corresponding secondary signal frames into a reconstructed one-dimensional secondary signal having a different modality than the audio signal.

2. The method of claim 1, wherein each frame has an identical size $\tau$.

3. The method of claim 1, wherein the transformer encoder has an add and normalization feature configured to add an output of a layer of the transformer encoder to an input of the layer and normalize values in the output of the layer.

4. The method of claim 1, wherein the multi-head self-attention mechanism includes an attention function that maps a query and a set of pairs of keys and values to an output, wherein the query, the keys, the values, and the output are all vectors.

5. The method of claim 4, wherein the multi-head self-attention mechanism is configured to compute the output vector as a weighted sum of the values.

6. The method of claim 5, wherein weights assigned to each value are computed by a compatibility function of the query with a corresponding one of the keys.

7. The method of claim 1, wherein the multi-head self-attention mechanism is configured to, for each sample, compute a score for that sample representing the relative importance of that sample relative to the other samples within that frame.

8. The method of claim 7, wherein the scores are associated with how much each sample should contribute to the output of the transformer encoder.

9. The method of claim 1, wherein the secondary signal is a torque signal or a vibration signal.

10. A system for converting a primary one-dimensional signal into a secondary one-dimensional signal of another modality, the system comprising:

a processor programmed to execute instructions stored in memory to:

splice a primary signal into a plurality of consecutive frames;

perform a first linear transformation to transform the frames into corresponding vectors;

execute positional encoding on the vectors to encode relative positional information associated with each sample, wherein the relative positional information is associated with a sequential position of each sample within its respective frame;

execute a multi-head self-attention mechanism configured to compare relative importance of the samples to each other within its respective frame to yield high-level representation vectors;

perform a second linear transformation to transform the high-level representation vectors into corresponding secondary signal frames; and concatenating the secondary signal frames into a reconstructed one-dimensional secondary signal having a different modality than the primary signal.

11. The system of claim 10, wherein each frame has an identical size.

12. The system of claim 10, wherein the multi-head self-attention mechanism has an add and normalization feature configured to add an output of a layer of the transformer encoder to an input of the layer and normalize values in the output of the layer.

13. The system of claim 10, wherein the multi-head self-attention mechanism includes an attention function that maps a query and a set of pairs of keys and values to an output, wherein the query, the keys, the values, and the output are all vectors.

14. The system of claim 13, wherein the multi-head self-attention mechanism is configured to compute the output vector as a weighted sum of the values.

15. The system of claim 14, wherein weights assigned to each value are computed by a compatibility function of the query with a corresponding one of the keys.

16. The system of claim 10, wherein the multi-head self-attention mechanism is configured to, for each sample within a respective one of the frames, compute a score for that sample representing the relative importance of that sample relative to the other samples in that frame.

17. The system of claim 16, wherein the scores are associated with how much each sample should contribute to the output of the transformer encoder.

18. The system of claim 10, wherein the primary signal is a sound signal.

19. A computer-controlled machine comprising the system of claim 10, wherein the computer-controlled machine further comprises an actuator configured to control an operation of the computer-controlled machine based on an output of the system.

20. A computer-controlled machine comprising:

at least one microphone configured to generate an audio signal;

a control system configured to predict an operational characteristic of the computer-controlled machine by translating the audio signal into a secondary one-dimensional signal representative of the operational characteristic, the control system configured to:

splice the audio signal into a plurality of frames, execute a first linear transformation to transform the frames into corresponding vectors;

execute positional encoding on the vectors to encode relative positional information associated with each sample;

execute a transformer encoder on the vectors with the encoded positional information, wherein the transformer encoder has a multi-head self-attention mechanism configured to compare relative importance of the samples to each other within the respective vectors to yield high-level representation vectors;

execute a second linear transformation to transform the high-level representation vectors into corresponding secondary signal frames; and concatenate the corresponding secondary signal frames into a reconstructed one-dimensional secondary signal having a different modality than the audio signal.

* * * * *